… … … … … … … … … … … … … … … … … …

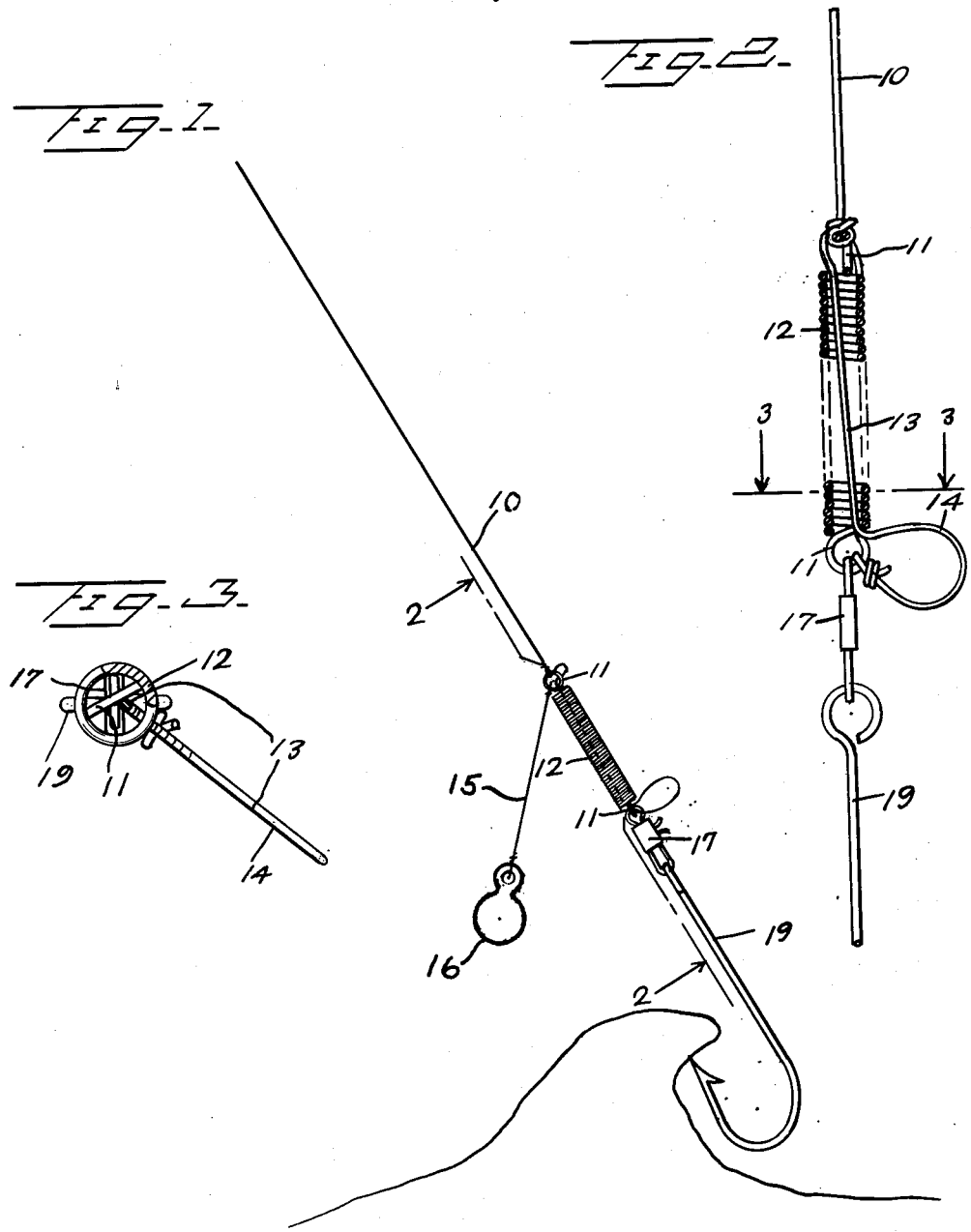

United States Patent Office 3,011,284
Patented Dec. 5, 1961

3,011,284
ANTI-SNAG DEVICE FOR FISHING LINES
Edward L. Sawyer, 498 E. Poplar St., Olathe, Kans.
Filed July 15, 1959, Ser. No. 827,182
1 Claim. (Cl. 43—42.72)

This invention relates to an anti-snag device for fishing lines.

It is well known, of course, that fish hooks and plugs frequently become caught on roots, rocks and other submerged objects. Quite often in such cases the hooks or plugs are lost.

The object of this invention is to provide an overload release device which will provide for extension of the line and facilitate the release of the hooks or plugs caught on an under water object.

It is a further object of the present invention to provide an overload release device which will provide for yielding of the line, but limit the extent of such yield, when the hook or plug is caught on an under water object.

Further objects, advantages and improvements will become apparent from the present specification, taken in connection with the accompanying drawing, in which:

FIGURE 1 is a view showing a fishing line with a hook on the end of same and an overload release device according to the present invention.

FIG. 2 is a longitudinal part sectional view on the line 2—2 of FIG. 1 showing the details of the overload release device according to the present invention, and FIG. 3 is a detail sectional view showing the details of the attachment of the overload release device according to the present invention, to the hook.

Referring now to the drawings in detail, and to FIG. 1 in particular, a fishing line 10 is here shown, having a hook 19 at the end, the hook being caught on a projection of a submerged rock, as shown. The principal component of the overload release device according to the present invention, is a coil spring 12, having upper and lower closed eye ends 11. The line 10 is tied to the upper eye 11, the free end 13 passing longitudinally through the coil spring and tied into the lower eye 11. The free end 13 of the line has a loop 14 therein, preferably about half an inch in diameter, and is tied into the lower closed eye 11. A sinker or casting weight 16 may be tied to the upper closed eye 11 by a short length of line 15, if desired.

A double snap connector 17 is engaged at one end with the lower closed eye 11 on the spring 12, and at the other end with a hook 19. A plug may, of course, be used instead of the hook 19.

The double snap connector consists of two detents, each attached at one end to one side of the main body 17 and adapted to engage at the other ends in recesses (not shown) in the main body.

The use of applicant's device should be readily understood from the preceding description. When the hook 19 is snagged on some submerged object, such as the rock as shown, by imparting a certain snap to the line 10, with the spring 12 extended, and then releasing likewise with a certain snap, the hook can be freed. Where the weight 16 is used, this weight, upon contraction of the spring 12, will strike the hook 19 and dislodge same from the submerged object.

In snapping the line, there should be an adequate length of loose line between the thumb and finger that moves the reel and snaps the line and reel. The thumb of the other hand will be used to hold the reel from turning and the snagged hook can be freed.

For bait fishing on the bottom of a body of water, the line is tied into the upper closed eye 11 of the coil spring 12, then extended through the spring with the half inch loop 14, as shown, and is tied at its lower end into the lower closed eye 11 of the coil spring. The casting weight 16, tied by a short length of line 15 to the upper closed eye 11 is used here.

The procedure is the same for plug fishing and for bait fishing. The hook 19 is removed by unsnapping the connector 17, removing the casting weight 16, tying the line into the plug eye, and snapping on the plug by the connector 17. The manner of freeing the line, should the hook become snagged, is the same as described above in connection with bait fishing.

Having now fully described my invention, what I claim as new and useful and desire to secure by Letters Patent of the United States is:

An anti-snag device for fishing lines comprised by a coiled contractile spring, a closed eye member at one end of said spring to which a fishing line is attached at a point spaced from one end of said fishing line, a portion of the line beyond the point of attachment to said spring passing longitudinally through said spring, a closed eye member at the other end of said spring to which a fish hook is secured, and to which the extremity of the line beyond said point of attachment is secured, the length of the line beyond said point of attachment being substantially longer than the distance between said eye members, providing a loop normally extended beyond one end of said coiled spring, said loop portion of the line being connected to the ends of said spring providing a spring extension limiting device, a second length of line connected to the eye at the end of the spring with which said fishing line is connected, and a weight connected to the latter line adapted to strike said fish hook dislodging said hook, as said spring is snapped.

References Cited in the file of this patent

UNITED STATES PATENTS

| 1,241,707 | Capooch et al. | Oct. 2, 1917 |
| 1,250,053 | Tukey | Dec. 11, 1917 |

FOREIGN PATENTS

| 99,805 | Sweden | July 11, 1940 |
| 986,156 | France | Mar. 4, 1951 |